United States Patent
Suzuki et al.

(10) Patent No.: US 8,092,086 B2
(45) Date of Patent: Jan. 10, 2012

(54) TEMPERATURE SENSOR

(75) Inventors: Tatsuya Suzuki, Nagoya (JP); Go Hanzawa, Kitanagoya (JP); Takeshi Morita, Kitanagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 306 days.

(21) Appl. No.: 12/326,175

(22) Filed: Dec. 2, 2008

(65) Prior Publication Data

US 2009/0147826 A1    Jun. 11, 2009

(30) Foreign Application Priority Data

Dec. 4, 2007 (JP) ................................ 2007-313809

(51) Int. Cl.
*G01K 1/00* (2006.01)
(52) U.S. Cl. ...................................... 374/208; 374/183
(58) Field of Classification Search .................. 374/208, 374/183
See application file for complete search history.

(56) References Cited

U.S. PATENT DOCUMENTS
2008/0080592 A1*  4/2008  Houben et al. ................ 374/185

FOREIGN PATENT DOCUMENTS
JP    2000-266609    9/2000
* cited by examiner

*Primary Examiner* — Lisa Caputo
*Assistant Examiner* — Mirellys Jagan
(74) *Attorney, Agent, or Firm* — Stite & Harbison PLLC; Jeffrey A. Haeberlin

(57) ABSTRACT

A temperature sensor includes: a temperature-sensing element comprising a temperature-sensing portion and an element electrode wire connected to the temperature-sensing portion; a sheath member comprising a sheath tube and a sheath core wire extending from the sheath tube, the sheath core wire being joined to the element electrode wire to form a joint portion; an enclosing member comprising a closed-bottomed tube having a bottom portion at one end, and enclosing at least the temperature-sensing element and the joint portion; and a holding material filling at least a portion of a space enclosed by the enclosing member extending between a front end face of the temperature-sensing portion and the bottom portion of the enclosing member. The element electrode wire includes a bend at an intermediate portion of the element electrode wire between the temperature-sensing portion and the joint portion.

13 Claims, 5 Drawing Sheets

TEMPERATURE SENSOR

BACKGROUND OF THE INVENTION

1. Field of the Invention

The present invention relates to a temperature sensor having a temperature-sensing element, such as a thermistor element or a Pt resistor element.

2. Description of Related Art

A conventionally known temperature sensor for detecting the temperature of, for example, exhaust gas of an automobile is described in Japanese Patent Application Laid-Open (kokai) No. 2000-266609.

As shown in FIG. 6A, such a conventional (i.e., prior art) temperature sensor 500 includes a thermistor element 502 and a sheath member 506. The thermistor element 502 includes a thermistor sintered-body 503 and element electrode wires 504. The sheath member 506 is configured such that sheath core wires 508 are insulatively held in a sheath tube 507. The element electrode wires 504 extending from the thermistor sintered-body 503 are joined, by laser spot welding, to sheath core wires 508 extending from the front end of the sheath tube 507. A resultant joint portion 510 and the thermistor element 502 are accommodated within a metal tube 512 made of a stainless steel alloy. In order to hold the thus-accommodated thermistor element 502 and other components, a space enclosed by the metal tube 512 is filled with a holding material, such as cement 514 formed of a heat-resistant oxide ($Al_2O_3$ (alumina) or the like).

The temperature of exhaust gas or the like varies in a wide range from a temperature in a low-temperature zone, such as about 0° C., to a temperature in a high-temperature zone, such as about 1,000° C. Thus, the temperature sensor 500 is used to detect a temperature in such a wide range. Accordingly, the conventional temperature sensor 500 is exposed to an environment of repeated cooling/heating (low-temperature/high-temperature) cycles.

When the temperature sensor 500 is cooled quickly from a high temperature to a low temperature, cooling starts from an outer circumferential or enclosing member; specifically, from the metal tube 512 (e.g., a closed-bottomed tube). The metal tube 512 is made of a stainless steel alloy; the cement 514 charged into (i.e., filling) the space enclosed by the metal tube 512 is of alumina; and the stainless steel alloy is higher in thermal expansion coefficient than alumina. Accordingly, as shown in FIG. 6B, when the metal tube 512 begins to contract as a result of cooling, the contraction of the cement 514 fails to follow that of the metal tube 512. As a result, a front end portion (bottom portion) of the metal tube 512 presses the cement 514 in the direction of arrow A. Accordingly, the front end face of the thermistor element 502 (more specifically, the thermistor sintered-body 503) held in the cement 514 is also pressed toward the sheath member 506 (rearward). When the thermistor element 502 is pressed toward the sheath member 506, shearing stress is applied to the joint portions 510 between the element electrode wires 504 and the sheath core wires 508 as illustrated by arrows B.

When shearing stress is repeatedly applied to the joint portions 510 between the element electrode wires 504 and the sheath core wires 508 in response to repeated cooling/heating cycles, in the worst case, the joint portion 510 is broken, resulting in failure to obtain a detection output (i.e., signal) from the thermistor element 502.

BRIEF SUMMARY OF THE INVENTION

An object of the present invention is to solve the above-mentioned problems of the prior art.

The present invention provides a temperature sensor in which shear stress applied to a joint portion between an element electrode wire and a sheath core wire is mitigated.

According to an aspect of the invention, a temperature sensor comprises: a temperature-sensing element comprising a temperature-sensing portion and an element electrode wire connected to the temperature-sensing portion and extending rearwardly from the temperature-sensing portion; a sheath member comprising a sheath tube and a sheath core wire extending from a front end of the sheath tube, the sheath core wire being joined to the element electrode wire to form a joint portion (a first joint portion from the temperature sensing portion), the sheath tube being positioned around at least a portion of the sheath core wire for insulating and holding the sheath core wire; an enclosing member made of metal, comprising a closed-bottomed tube having a bottom portion at one end, and enclosing at least the temperature-sensing element and the joint portion; and a holding material filling at least a portion of a space enclosed by the enclosing member extending between a front end face of the temperature-sensing portion and the bottom portion of the enclosing member. The element electrode wire includes a bend at an intermediate portion of the element electrode wire between the temperature-sensing portion and the joint portion.

With respect to the bend at the intermediate portion of the element electrode wire, even in the case where, for example, at the time of quick cooling, contraction of the holding material fails to follow contraction of the enclosing member, and consequently the enclosing member presses the temperature-sensing element (more specifically, the front end face of the temperature-sensing portion) toward the sheath member via the holding member, the bend is deformed, whereby an associated pressing force can be dispersed. Therefore, shearing stress applied to the joint portion between the element electrode wire and the sheath core wire is mitigated.

Preferably, the bend at the intermediate portion of the element electrode wire comprises an arcuate bend. By virtue of the bend being an arcuate bend, when the temperature-sensing element is pressed toward the sheath member an associated pressing force can be reliably dispersed. Also, since bending the element electrode wire arcuately is relatively easy, time required for the bending process can be shortened.

In accordance with one implementation, a region enclosed by the enclosing member is divided into a first region and a second region by a predetermined reference plane which contains a center axis of the sheath tube of the sheath member and serves as a boundary plane. The sheath core wire extending from the front end of the sheath tube is bent such that a front end portion of the sheath core wire is located in the second region. The bend at the intermediate portion of the element electrode wire comprises a convex bend having an apex extending toward the first region. The element electrode wire is joined to the front end portion of the sheath core wire and is disposed, at the joint portion, on a side toward the first region in relation to the sheath core wire.

When the element electrode wire and the sheath core wire are joined together in such an arrangement that the element electrode wire is disposed on the side toward the first region in relation to the sheath core wire, there is no risk of the bend interfering with the front end portion of the sheath core wire. Also, since the front end portion of the sheath core wire is located in the second region, even when the element electrode wire and the sheath core wire are joined together in such an arrangement that the element electrode wire is disposed on the side toward the first region in relation to the sheath core wire, the temperature-sensing element can be aligned with the reference plane. Also, even though the bend of the element electrode wire is bent convexly toward the first region, there is no risk of the bend coming into contact with the inner wall surface of the enclosing member.

Notably, the center axis of the sheath tube of the sheath member means an axis which extends through the center of the sheath tube along the direction of the sheath tube.

In accordance with another implementation, a reference axis contains a center axis of the sheath tube of the sheath member. The sheath core wire extending from a front end of the sheath tube comprises a straight wire. The bend at the intermediate portion of the element electrode wire is bent such that when the element electrode wire is joined to the sheath core wire, the temperature-sensing portion of the temperature-sensing element is aligned with the reference axis. Thus, even when the sheath core wire is straight, the temperature-sensing element can be aligned with the reference axis. Accordingly, the temperature sensor does not require a process of bending the sheath core wire, whereby a manufacturing process can be simplified.

In accordance with a further implementation, a predetermined reference plane contains a center axis of the sheath tube of the sheath member, and the bend at the intermediate portion of the element electrode wire extends along the predetermined reference plane. Employment of such a configuration also mitigates the shearing stress applied to the joint portion between the element electrode wire and the sheath core wire.

Preferably, the element electrode wire projects from a rear end face of the temperature-sensing portion and extends rearwardly. Since the element electrode wire projects from the rear end face of the temperature-sensing portion and extends rearwardly, when the temperature-sensing element is pressed from its front end face, an associated pressing force is transmitted directly to the element electrode wire from the rear end face of the temperature-sensing element and is dispersed at the bend.

The form of implementation of the present invention is not limited to a device such as the above-mentioned temperature sensor. The present invention can be implemented in the form of a process such as a method of detecting temperature.

BRIEF DESCRIPTION OF THE SEVERAL
VIEWS OF THE DRAWINGS

These and other features, aspects, and advantages of the present invention will become better understood with regard to the following description, appended claims, and accompanying drawings where:

DETAIL DESCRIPTION OF EXEMPLARY
EMBODIMENTS OF THE INVENTION

A. First Exemplary Embodiment

Figure 7:
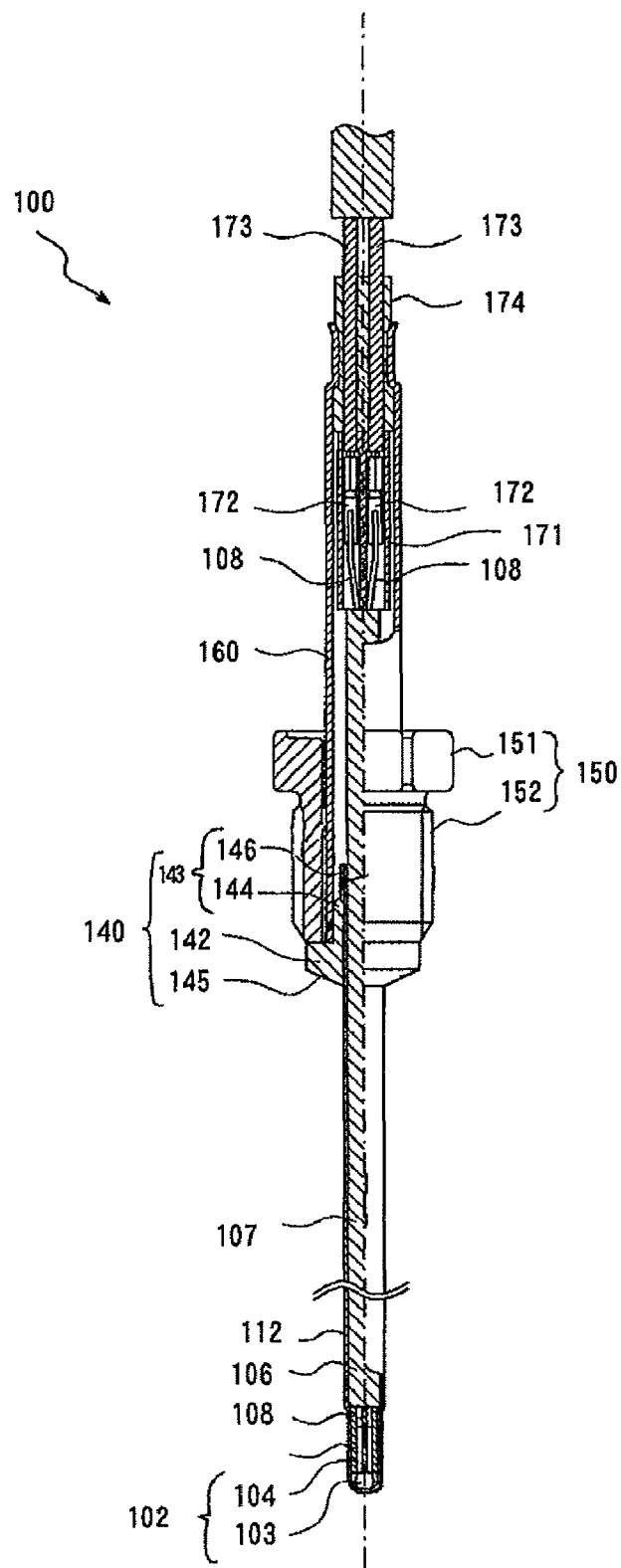
FIG. 7 is a side elevational view with selected portions cut away of an exemplary temperature sensor assembly, including an exemplary temperature sensor according to FIG. 1.

FIG. 1 is an explanatory view showing the configuration of essential portions of a temperature sensor according to a first exemplary embodiment of the present invention. FIG. 7 is an explanatory view showing the entire configuration of the temperature sensor of the first embodiment, in which a portion of the sensor is cut away. FIG. 1 corresponds to an enlarged sectional view of essential portions of a temperature sensor 100 as viewed by cutting the temperature sensor 100 of FIG. 7 by a plane which is perpendicular to the plane of the image (i.e., the paper) of FIG. 7 and in parallel with the center axis of the temperature sensor 100, such that one of two element electrode wires 104 is included.

The temperature sensor 100 of the present invention is preferably used to detect the temperature of exhaust gas of an automobile. Accordingly, the temperature sensor 100 is exposed to an environment of repeated cooling/heating cycles which could involve temperature variations ranging widely from a temperature in a low-temperature zone, such as about 0° C., to a temperature in a high-temperature zone, such as about 1,000° C.

First, as shown in FIG. 7, the temperature sensor 100 is configured such that a temperature-sensing element, such as a thermistor element 102, is disposed in an enclosing member, such as in an interior of a front end portion of a metal tube 112. The metal tube 112 assumes the form of or comprises a closed-bottomed tube. The rear end of the metal tube 112 is opened. A rear end portion of the metal tube 112 is press-fitted to an inner surface of a flange member 140. The flange member 140 includes an axially extending tubular sheath portion 143 and a flange portion 142. The flange portion 142 is located frontward of the sheath portion 143, has an outside diameter greater than that of the sheath portion 143, and projects radially outward. The flange portion 142 has a tapered seat face 145 on its front end. The seat face 145 seals against a mounting portion of an exhaust pipe through which exhaust gas flows. The sheath portion 143 is in a two-step form consisting of a first stepped portion 144 located frontward of a second stepped portion 146, which is smaller in diameter than the first stepped portion 144.

The metal tube 112 press-fitted into the flange member 140 is welded such that its outer circumferential surface and the second stepped portion 146 are laser-welded together along its entire circumference. A cylindrical sleeve 160 made of metal is press-fitted onto the first stepped portion 144 of the flange member 140 and is laser-welded to the first stepped portion 144 along its entire circumference. A mounting member 150 having a hexagonal nut portion 151 and a threaded portion 152 is rotatably provided around the flange member 140 and the cylindrical sleeve 160. The temperature sensor 100 of the present embodiment is fixed to an exhaust pipe such that while the seat face 145 of the flange member 140 is in contact with a mounting portion of the exhaust pipe, the mounting member 150 is threadingly engaged with the mounting portion.

A sheath member 106 is disposed in the interiors of the metal tube 112, the flange member 140, and sleeve 160. The sheath member 106 insulates and holds two sheath core wires 108 in the interior of a sheath tube 107. In the interior of the metal tube 112, the element electrode wires 104 of the thermistor element 102 are joined, such as by laser-spot-welding, to the corresponding sheath core wires 108 extending from the front end of the sheath tube 107 of the sheath member 106, forming a joint portion 110 (a first joint portion). The sheath core wires 108 extend rearwardly from the sheath member 106 and are connected to two lead wires 173, respectively, via crimp terminals 172. Insulation tubes 171 insulate the sheath core wires 108 from each other and insulate the crimp terminals 172 from each other. The two lead wires 173 extend to the exterior of the sleeve 160 through corresponding lead wire insertion holes of an elastic seal member 174 fitted into a rear end portion of the sleeve 160 and are connected to an external circuit via unillustrated connectors.

Next, essential portions of the first embodiment will be described with reference to FIG. 1A. The thermistor element 102 includes temperature-sensing portion, such as a thermistor sintered-body 103, and element electrode wires 104. The thermistor sintered-body 103 is formed of a perovskite-type oxide having a base composition of $(Sr, Y)(Al, Mn, Fe)O_3$. The thermistor sintered-body 103 is in the shape of a hexagonal prism. The element electrode wires 104 (two) extend rearwardly from a rear end face of the thermistor sintered-body 103. The sheath member 106 has the following configuration: the sheath core wires 108 (two) are disposed in the sheath tube 107, which is made of a stainless steel alloy, and the sheath tube 107 is filled with a sheath filler (not shown) so as to hold the sheath core wires 108. The sheath core wires 108 extend from the front end of the sheath tube 107. Each of the two element electrode wires 104 of the thermistor element 102 and each of the two sheath core wires 108 of the sheath member 106 have a circular cross section. Projecting end portions of the element electrode wires 104 overlie and are joined, such as by laser-spot-welding, to those of the corresponding sheath core wires 108 to form the joint portion 110. The metal tube 112 comprises a closed-bottomed tube and is made of a stainless steel alloy. The metal tube 112 accommodates the thermistor element 102, the joint portions 110 resulting from the laser-spot-welding, and a portion of the sheath member 106. Further, a holding material or holding member, such as cement 114, is formed of a heat-resistant oxide which contains an insulating ceramic component; specifically, $Al_2O_3$ (alumina) as a main component, and silica as aggregate. The cement 114 is charged into and fills at least a portion of a space enclosed by the metal tube 112, thereby holding at least the thermistor element 102 and the joint portions 110.

In FIG. 1, X and Y indicate axes of coordinates. The Y-axis extends along the plane of the illustration (i.e., the paper) of FIG. 1, and the X-axis extends perpendicularly to the plane of the illustration of FIG. 1. A reference line Z is the centerline of the temperature sensor 100 and contains the centerline of the sheath tube 107 of the sheath member 106. With respect to a reference plane that is perpendicular to the plane of the illustration of FIG. 1 and contains the reference line Z, a region enclosed by the metal tube 112 can be divided into a first or upper region (a region on the plus side along the direction of the Y-axis) and a second or lower region (a region on the minus side along the direction of the Y-axis) by the reference plane which serves as a boundary plane.

Figure 1A:
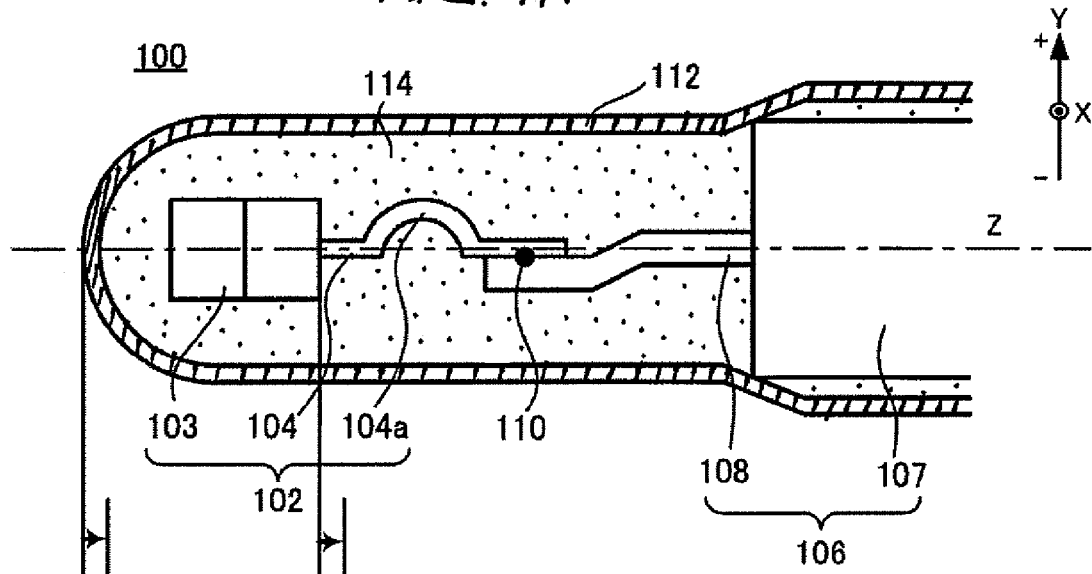
FIG. 1A and FIG. 1B are side elevational views with selected portions cut away of a first embodiment of an exemplary temperature sensor according to the invention.

In the present embodiment, as shown in FIG. 1A, the sheath core wires 108 extending from the front end of the sheath tube 107 extend straight along the reference plane; are then bent obliquely toward the second or lower region; and again extend straight in parallel with the reference plane. Accordingly, projecting end portions of the sheath core wires 108 are located in the second or lower region.

Meanwhile, the element electrode wires 104 extending from the thermistor sintered-body 103 extend straight along the reference plane. However, intermediate portions of the element electrode wires 104 comprise an arcuate bend having an apex extending toward the first or upper region, thereby forming bends 104a.

The element electrode wires 104 and the sheath core wires 108 are respectively joined together with the element electrode wires 104 being located on the upper side (on the plus side along the direction of the Y-axis and toward the first or upper region) and the sheath core wires 108 being located on the lower side or in the second region (on the minus side along the direction of the Y-axis).

Figure 1B:
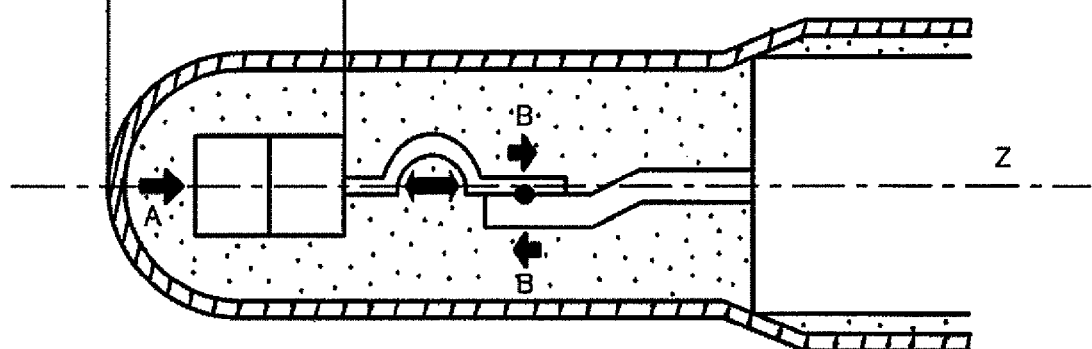

The temperature sensor 100 of the present embodiment is also exposed to an environment of repeated cooling/heating cycles. Thus, when the temperature sensor 100 is cooled quickly from a high temperature to a low temperature, cooling starts from an outer circumferential member; specifically, from the metal tube 112. The metal tube 112 is made of a stainless steel alloy, and the cement 114 charged into the space enclosed by the metal tube 112 contains a predominant amount of alumina. As mentioned previously, the stainless steel alloy is higher in thermal expansion coefficient than alumina. Accordingly, when the metal tube 112 begins to contract as a result of cooling, the contraction of the cement 114 fails to follow that of the metal tube 112. As a result, as shown in FIG. 1B, a front end portion (bottom portion) of the metal tube 112 presses the contained cement 114 rearwardly in the direction of arrow A. Accordingly, the thermistor element 102 (more specifically, a front end face of the thermistor sintered-body 103) held in the cement 114 is also pressed rearwardly toward the sheath member 106. However, since the element electrode wires 104 extending from the thermistor sintered-body 103 have the bends 104a at their intermediate portions as described above, even though the thermistor element 102 is pressed toward the sheath member 106, the bends 104a are deformed, whereby an associated pressing force can be dispersed. Thus, even though shearing stress is applied to the joint portions 110 between the element electrode wires 104 and the sheath core wires 108 as indicated by arrows B, the shearing stress is greatly mitigated.

Also, in the present embodiment, the bends 104a of the element electrode wires 104 are upwardly convex (convex toward the plus side along the direction of the Y-axis). Thus, when the element electrode wires 104 and the sheath core wires 108 are to be respectively joined together with the element electrode wires 104 being located on the upper side (on the plus side along the direction of the Y-axis) and the sheath core wires 108 being located on the lower side (on the minus side along the direction of the Y-axis), there is no risk of the bends 104a interfering with projecting end portions of the sheath core wires 108.

Figure 2:
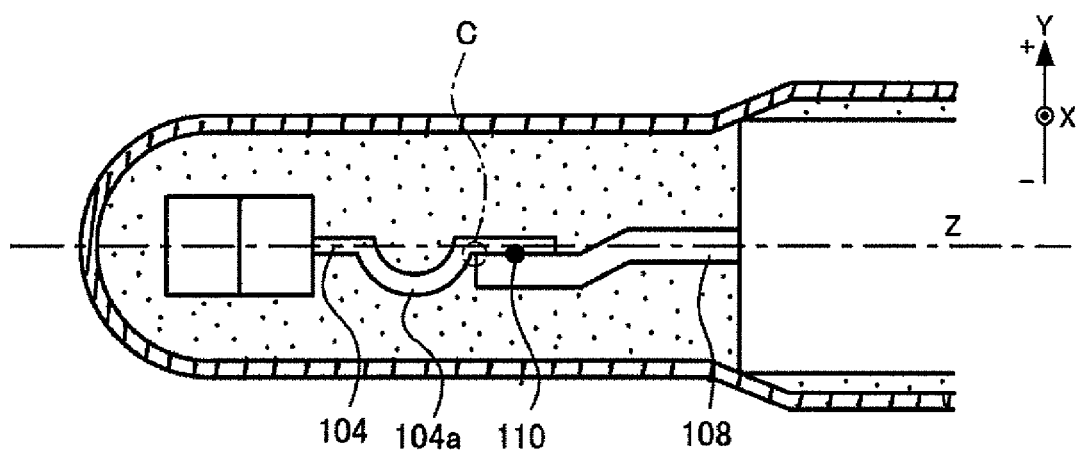
FIG. 2 is a side elevational view with selected portions cut away of a temperature sensor wherein bends of element electrode wires are downwardly convex.

By contrast, assuming that, as shown in FIG. 2, the bends 104a of the element electrode wires 104 are downwardly convex (convex toward the minus side along the direction of the Y-axis), when the element electrode wires 104 and the sheath core wires 108 are to be respectively joined together with the element electrode wires 104 being located on the upper side (on the plus side along the direction of the Y-axis) and the sheath core wires 108 being located on the lower side (on the minus side along the direction of the Y-axis), the bends 104a interfere with the projecting end portions of the sheath core wires 108 at a portion C; consequently, the element electrode wires 104 and the sheath core wires 108 fail to be in close contact with each other, resulting in a possible failure of the joint portion 110.

Also, in the present embodiment, the projecting end portions of the sheath core wires 108 are located in the lower region as mentioned above. Thus, even when the element electrode wires 104 and the sheath core wires 108 are respectively joined together with the element electrode wires 104 being located on the upper side (on the plus side along the direction of the Y-axis) and the sheath core wires 108 being located on the lower side (on the minus side along the direction of the Y-axis), the thermistor element 102 can be aligned with the reference plane. By virtue of the thermistor element 102 being aligned with the reference plane, heat is transmitted to the thermistor element 102 uniformly from every direction via the metal tube 112. Therefore, the thermistor element 102 can accurately detect the temperature of exhaust gas.

Further, in the present embodiment, the projecting end portions of the sheath core wires 108 are located in the lower region. Thus, even though the bends 104a of the element electrode wires 104 are upwardly convex (convex toward the plus side along the direction of the Y-axis), there is no risk of the bends 104a coming into contact with the inner wall surface of the metal tube 112.

Figure 3:
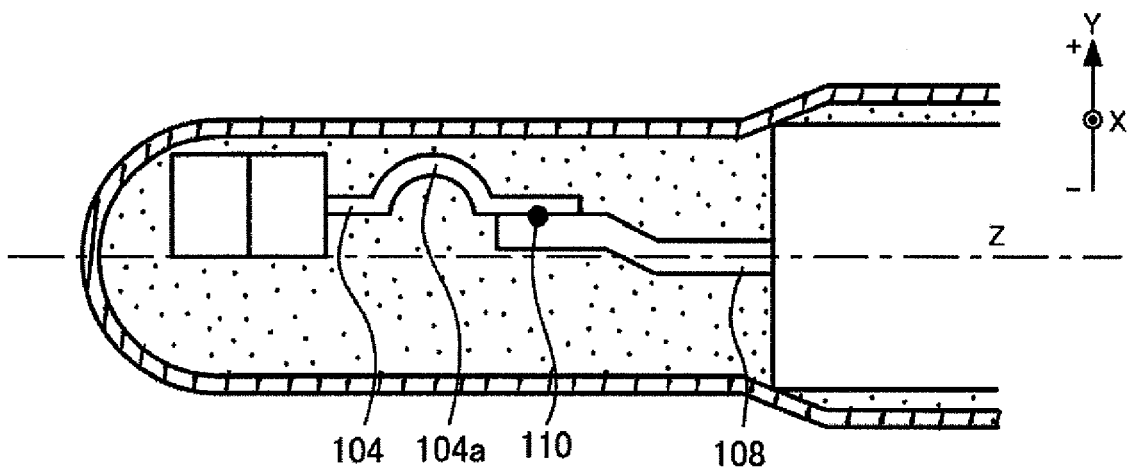
FIG. 3 is a side elevational view with selected portions cut away of a temperature sensor wherein projecting end portions of sheath core wires are located in an upper region.

By contrast, assuming that, as shown in FIG. 3, the projecting end portions of the sheath core wires 108 are located in the upper region, when the element electrode wires 104 and the sheath core wires 108 are respectively joined together with the element electrode wires 104 being located on the upper side (on the plus side along the direction of the Y-axis) and the sheath core wires 108 being located on the lower side (on the minus side along the direction of the Y-axis), the thermistor element 102 is located in the upper region and cannot be aligned with the reference plane. When the bends 104a of the element electrode wires 104 are upwardly convex (convex toward the plus side along the direction of the Y-axis), the bends 104a and the thermistor sintered-body 103 may come into contact with the inner wall surface of the metal tube 112.

As described above, according to the present embodiment, the element electrode wires 104 extending from the thermistor sintered-body 103 include the bends 104a at their intermediate portions, thereby yielding the effect of greatly mitigating shearing stress which is applied to the joint portions 110 between the element electrode wires 104 and the sheath core wires 108.

B. Second Exemplary Embodiment

Figure 4:
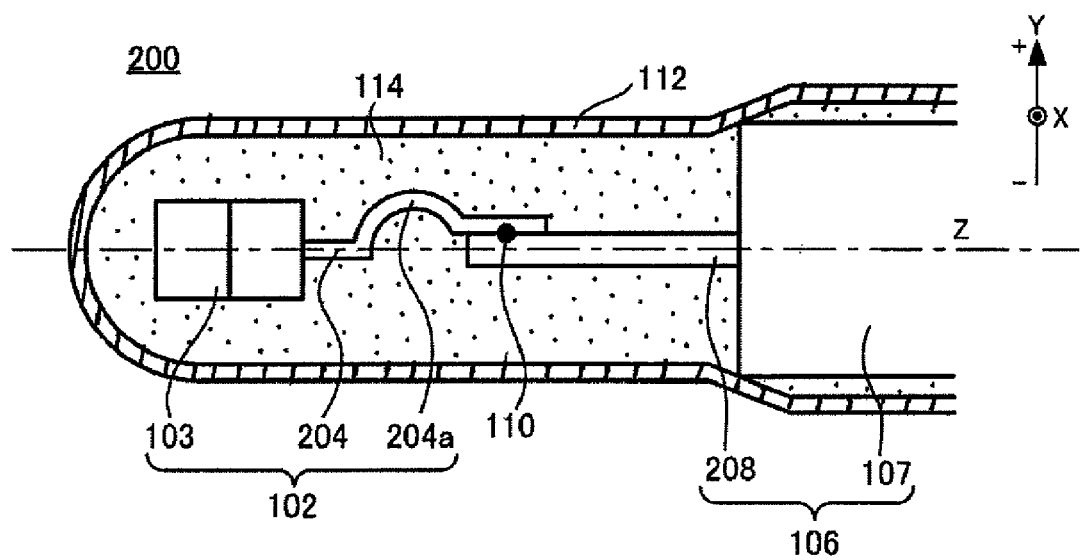
FIG. 4 is a side elevational view with selected portions cut away of a second embodiment of an exemplary temperature sensor according to the invention.

FIG. 4 is an explanatory view showing the configuration of a temperature sensor according to a second exemplary embodiment of the present invention.

A temperature sensor 200 of the second exemplary embodiment differs from the temperature sensor 100 of the first exemplary embodiment in at least two points. First, as shown in FIG. 4, sheath core wires 208 extending from the front end of the sheath tube 107 are not bent, but extend straight. Second, although element electrode wires 204 extending from the thermistor sintered-body 103 extend straight along the reference plane and have, at their intermediate portions, bends 204a comprising a convex bend having an apex extending toward the upper region, the bends 204a are bent such that projecting end portions of the element electrode wires 204 are not aligned with the reference plane, but are located in the upper region. Other configuration features are similar to those of the first exemplary embodiment and are denoted by like reference numerals, and repeated description thereof is omitted.

In the second exemplary embodiment, as described above, the bends 204a of the element electrode wires 204 are bent such that the projecting end portions of the element electrode wires 204 are located in the upper region. Thus, even though the sheath core wires 208 extend straight, when the element electrode wires 204 and the sheath core wires 208 are respectively joined together with the element electrode wires 104 being located on the upper side (on the plus side along the direction of the Y-axis) and the sheath core wires 108 being located on the lower side (on the minus side along the direction of the Y-axis), the thermistor element 102 can be aligned with a reference axis which contains a center axis of the sheath tube 107. Thus, according to the present embodiment, there is no need to bend the sheath core wires 208, so that a manufacturing process can be simplified accordingly.

In the present embodiment also, the intermediate portions of the element electrode wires 204 extending from the thermistor sintered-body 103 comprise bends 204a. Thus, as in the case of the first exemplary embodiment, the second exemplary embodiment greatly mitigates shearing stress applied to the joint portions 110 between the element electrode wires 204 and the sheath core wires 208.

C. Third Exemplary Embodiment

Figure 5:
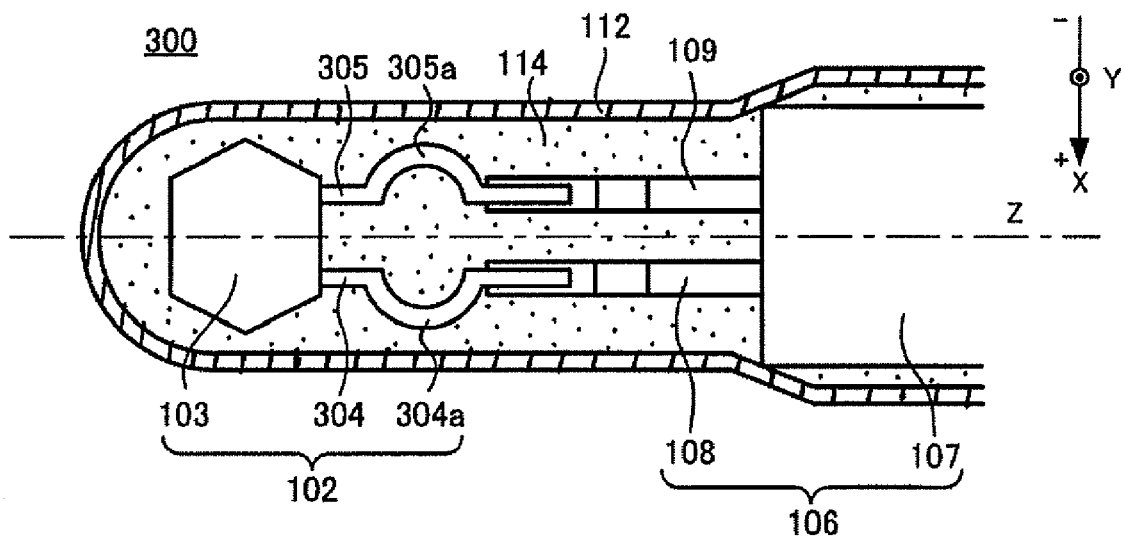
FIG. 5 is a top plan view with selected portions cut away of a third embodiment of an exemplary temperature sensor according to the invention.
Figure 6A:
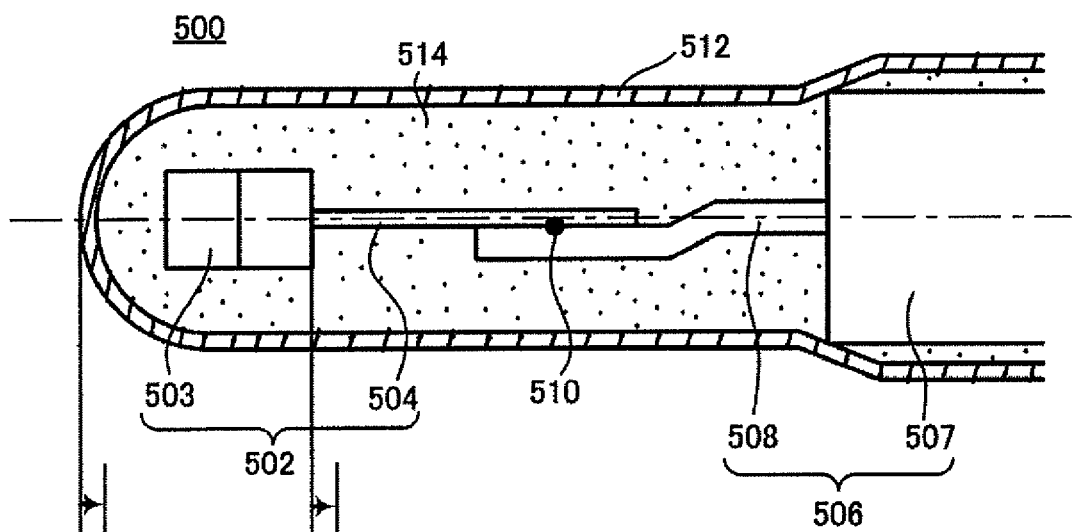
FIG. 6A and FIG. 6B are side elevational views with selected portions cut away of a conventional (i.e., prior art) temperature sensor.
Figure 6B:
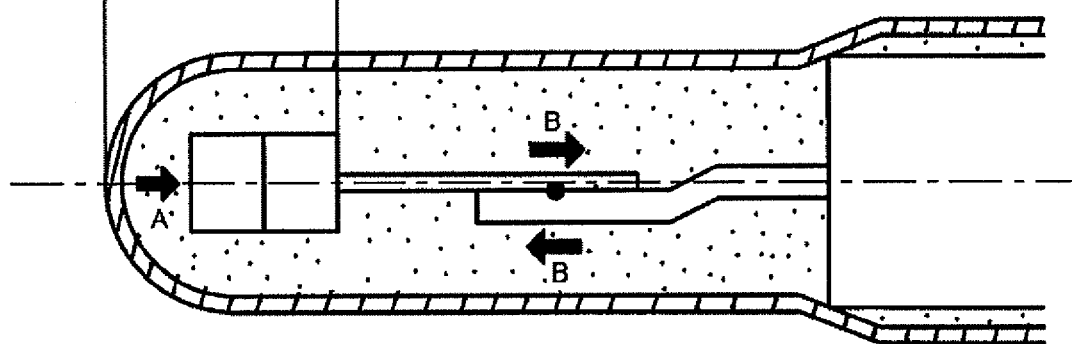

FIG. 5 is an explanatory view showing the configuration of a temperature sensor according to a third exemplary embodiment of the present invention. Different from the views of FIGS. 1 and 4, the view of FIG. 5 is angularly displaced by 90 degrees from the views of FIGS. 1 and 4 about the reference axis Z.

In FIG. 5, X and Y indicate axes of coordinates. However, since, as mentioned above, the view of FIG. 5 is angularly displaced by 90 degrees from the views of FIGS. 1 and 4, the Y-axis extends perpendicularly to the plane of the image (i.e., the paper) of FIG. 5, and the X-axis extends along the plane of the image of FIG. 5. The reference plane which is assumed in the first and second embodiments and contains the reference line Z extends along the plane of the image of FIG. 5.

A temperature sensor 300 of the third exemplary embodiment differs from the temperature sensor 100 of the first exemplary embodiment in that, as shown in FIG. 5, element electrode wires 304 and 305 extending from the thermistor sintered-body 103 extend straight along the reference plane and have, at their intermediate portions, respective bends 304a and 305a. Bends 304a and 305a comprise an arcuate bend along the reference plane and in opposition to each other with respect to the direction of the X-axis. Other configuration features are similar to those of the first embodiment and are denoted by like reference numerals, and repeated description thereof is omitted.

As mentioned above, the bends 304a and 305a of the element electrode wires 304 and 305 may extend along the reference plane. In the third exemplary embodiment, the bends 304a and 305a are convex away from each other with respect to the direction of the X-axis and therefore do not interfere with each other.

In the third exemplary embodiment also, the element electrode wires 304 and 305 extending from the thermistor sintered-body 103 have the bends 304a and 305a at their intermediate portions. Thus, as in the case of the first embodiment, the present embodiment greatly mitigates shearing stress applied to the joint portions between the element electrode wires 304 and 305 and sheath core wires 108 and 109, respectively.

D. Modified Exemplary Embodiments

The present invention is not limited to the above-described exemplary embodiments or modes, but may be embodied in various other forms without departing from the spirit or the scope of the invention.

In the above description of the first embodiment, possible problems involved in the configurations shown in FIGS. 2 and 3 are pointed out. However, if these problems are solved, the configurations shown in FIGS. 2 and 3 may be employed as embodiments of the present invention.

Also, the two element electrode wires extending from the thermistor sintered-body may differ from each other in shape including that of the bends. In response to the difference in shape, the two sheath core wires extending from the front end of the sheath tube may differ in shape from each other.

For example, one of the two element electrode wires and the sheath core wire joined to the element electrode wire may have the respective shapes mentioned in the description of the first embodiment, whereas the other element electrode wire and the sheath core wire joined to the other element electrode wire may be shaped upside down in relation to their respective shapes mentioned in the description of the first embodiment (specifically, the associated bend comprises a convex bend having an apex extending downward (toward the minus side along the direction of the Y-axis). This convention is also applied to the case of using the shapes mentioned in the description of the second embodiment. Also, for example, one of the two element electrode wires and the sheath core wire joined to the element electrode wire may have the respective shapes mentioned in the description of the first embodiment, whereas the other element electrode wire and the sheath core wire joined to the other element electrode wire may have the shapes mentioned in the description of the second embodiment. Also, another combination of shapes of other embodiments may be used.

In the above-described first and second embodiments, the bends of the element electrode wires extend along respective planes perpendicular to the reference plane. In the above-described third embodiment, the bends of the element electrode wires extend along the reference plane. However, the present invention is not limited thereto. The bends of element electrode wires may be aligned with a plane(s) other than those planes.

In the above-described embodiments, the bends of the element electrode wires are arcuately formed. However, the present invention is not limited thereto. For example, the bends may assume other shapes, such as a triangular shape, a rectangular shape, another polygonal shape, a zigzag shape, or a spiral shape.

In the above-described embodiments, the temperature sensor is configured such that a portion of the sheath member 106 is accommodated in the metal tube 112 fixed to the flange member 140. However, the present invention is not limited thereto. For example, the present invention may be applied to a temperature sensor configured as follows: the sheath tube 107 of the sheath member 106 is fixedly attached to the inner surface of the flange member 140, and a closed-bottomed tubular metal cap which accommodates therein the thermistor element 102 and the joint portions 110 is welded to the outer circumference of the sheath tube 107 projecting from the front end of the flange member 140. In this case, the closed-bottomed tubular metal cap corresponds to the enclosing member in the claims.

The above-described embodiments use $Al_2O_3$ (alumina) as the cement. However, other materials, such as MgO or $SiO_2$, may also be used as the cement.

The above-described embodiments use the thermistor element as a temperature-sensing element. The present invention is not limited thereto. For example, other temperature-sensing elements, such as a Pt resistor element, may be utilized.

DESCRIPTION OF REFERENCE NUMERALS

Reference numerals and associated element names, as used herein, are as follow:

100: temperature sensor
102: thermistor element
103: thermistor sintered-body
104: element electrode wire
104a: bend
106: sheath member
107: sheath tube
108, 109: sheath core wire
110: joint portion
112: metal tube
114: cement
200: temperature sensor
204: element electrode wire
204a: bend
208: sheath core wire
300: temperature sensor
304, 305: element electrode wire
304a, 305a: bend
500: temperature sensor
502: thermistor element
503: thermistor sintered-body
504: element electrode wire
506: sheath member
507: sheath tube
508: sheath core wire
510: joint portion
512: metal tube
514: cement Variations and Modifications of Exemplary Embodiments Although the invention has been described above in relation to exemplary embodiments thereof, it will be understood by those skilled in the art that variations and modifications can be effected in these exemplary embodiments without departing from the scope and spirit of the invention.

What is claimed is:

1. A temperature sensor comprising:
   a temperature-sensing element comprising a temperature-sensing portion and an element electrode wire connected to the temperature-sensing portion and extending rearwardly from the temperature-sensing portion;
   a sheath member comprising a sheath tube and a sheath core wire extending from a front end of the sheath tube, the sheath core wire being joined to the element electrode wire to form a first joint portion from the temperature sensing portion, the sheath tube being positioned around at least a portion of the sheath core wire for insulating and holding the sheath core wire;
   an enclosing member made of metal, comprising a closed-bottomed tube having a bottom portion at one end, and enclosing at least the temperature-sensing element and the joint portion; and
   a holding material filling at least a portion of a space enclosed by the bottom portion of the enclosing member and holding, in the bottom portion of the enclosing member, at least the temperature-sensing portion, the element electrode wire, and the first joint portion from the temperature sensing portion;
   the element electrode wire including a bend at an intermediate portion of the element electrode wire between the temperature-sensing portion and the first joint portion from the temperature sensing portion, the bend for mitigating a shearing stress applied to the joint portion as a result of thermal contraction.

2. A temperature sensor according to claim 1, wherein the element electrode wire projects from a rear end face of the temperature-sensing portion and extends rearwardly.

3. A temperature sensor according to claim 1, further comprising a region enclosed by the enclosing member divided into a first region and a second region by a predetermined reference plane which contains a center axis of the sheath tube of the sheath member and serves as a boundary plane, wherein the sheath core wire extending from the front end of the sheath tube is bent such that a front end portion of the sheath core wire is located in the second region, wherein the bend at the intermediate portion of the element electrode wire comprises a convex bend having an apex extending toward the first region, and wherein the element electrode wire is joined to the front end portion of the sheath core wire and is disposed, at the first joint portion, on a side toward the first region in relation to the sheath core wire.

4. A temperature sensor according to claim 3, wherein the element electrode wire projects from a rear end face of the temperature-sensing portion and extends rearwardly.

5. A temperature sensor according to claim 1, further comprising a reference axis which contains a center axis of the sheath tube of the sheath member, wherein the sheath core wire extending from a front end of the sheath tube comprises a straight wire, and wherein the bend at the intermediate portion of the element electrode wire is bent such that, when the element electrode wire is joined to the sheath core wire, the temperature-sensing portion of the temperature-sensing element is aligned with the reference axis.

6. A temperature sensor according to claim 5, wherein the element electrode wire projects from a rear end face of the temperature-sensing portion and extends rearwardly.

7. A temperature sensor according to claim 1, further comprising a predetermined reference plane which contains a center axis of the sheath tube of the sheath member, wherein the bend at the intermediate portion of the element electrode wire extends along the predetermined reference plane.

8. A temperature sensor according to claim 7, wherein the element electrode wire projects from a rear end face of the temperature-sensing portion and extends rearwardly.

9. A temperature sensor according to claim 1, wherein the bend at the intermediate portion of the element electrode wire comprises an arcuate bend.

10. A temperature sensor according to claim 9, further comprising a region enclosed by the enclosing member being divided into a first region and a second region by a predetermined reference plane which contains a center axis of the sheath tube of the sheath member and serves as a boundary plane, wherein the sheath core wire extending from the front end of the sheath tube is bent such that a front end portion of the sheath core wire is located in the second region, wherein the bend at the intermediate portion of the element electrode wire comprises a convex bend having an apex extending toward the first region, and wherein the element electrode wire is joined to the front end portion of the sheath core wire and is disposed, at the first joint portion, on a side toward the first region in relation to the sheath core wire.

11. A temperature sensor according to claim 9, further comprising a reference axis which contains a center axis of the sheath tube of the sheath member, wherein the sheath core wire extending from a front end of the sheath tube comprises a straight wire, and wherein the bend at the intermediate portion of the element electrode wire is bent such that when the element electrode wire is joined to the sheath core wire, the temperature-sensing portion of the temperature-sensing element is aligned with the reference axis.

12. A temperature sensor according to claim 9, further comprising a predetermined reference plane which contains a center axis of the sheath tube of the sheath member, wherein the bend at the intermediate portion of the element electrode wire extends along the predetermined reference plane.

13. A temperature sensor according to claim 9, wherein the element electrode wire projects from a rear end face of the temperature-sensing portion and extends rearwardly.

* * * * *